US008885227B2

(12) United States Patent
Godley

(10) Patent No.: US 8,885,227 B2
(45) Date of Patent: Nov. 11, 2014

(54) SYSTEM AND METHOD FOR MULTIPLE PAGE-PER-SHEET PRINTING

(75) Inventor: Hector Stuart Godley, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 1312 days.

(21) Appl. No.: 11/347,983

(22) Filed: Feb. 6, 2006

(65) Prior Publication Data
US 2007/0182973 A1 Aug. 9, 2007

(51) Int. Cl.
H04N 1/23 (2006.01)
H04N 1/00 (2006.01)
G06K 15/00 (2006.01)
G06F 3/12 (2006.01)
G03G 15/00 (2006.01)

(52) U.S. Cl.
CPC ......... H04N 1/0035 (2013.01); H04N 1/00461 (2013.01); G06F 3/1208 (2013.01); H04N 1/00453 (2013.01); H04N 1/00448 (2013.01); H04N 1/00442 (2013.01); H04N 1/00957 (2013.01)
USPC ........ 358/300; 358/1.12; 358/1.14; 358/1.15; 399/87

(58) Field of Classification Search
CPC . G06F 3/1208; H04N 1/00442; H04N 1/0035
USPC .......................... 358/1.12, 1.14, 1.15; 399/87
See application file for complete search history.

(56) References Cited

U.S. PATENT DOCUMENTS

| 6,222,947 | B1* | 4/2001 | Koba | 382/284 |
| 6,509,974 | B1* | 1/2003 | Hansen | 358/1.12 |
| 6,961,135 | B1* | 11/2005 | Nakagiri et al. | 358/1.1 |
| 7,233,407 | B1* | 6/2007 | Simchik et al. | 358/1.15 |
| 7,299,413 | B2* | 11/2007 | Mori | 715/255 |
| 7,495,796 | B2* | 2/2009 | Keane et al. | 358/1.18 |
| 7,679,774 | B2* | 3/2010 | Petz | 358/1.18 |
| 2005/0157330 | A1* | 7/2005 | Giuliano | 358/1.15 |

FOREIGN PATENT DOCUMENTS

TW 504622 10/2002

OTHER PUBLICATIONS

Chinese Patent Application, Office Action issued on Jun. 13, 2008 for Application No. 2007100037824, 7 pages.
Taiwanese Patent Office, Information Disclosure Statement of Nov. 16, 2009, Application No. 09820730830, 4 pages.

* cited by examiner

Primary Examiner — King Poon
Assistant Examiner — Neil R McLean
(74) Attorney, Agent, or Firm — Haynes and Boone, LLP

(57) ABSTRACT

A method, computer-readable medium and data processing system for printing multiple data sources is provided. A plurality of data sources is collected. Each data source of the plurality of data sources are assigned to one of a plurality of sheet representations that each comprise a logical representation of one of a sequence of sheets on which the data sources are to be printed. A number of data sources assigned to a sheet representation is independent of a number of data sources assigned to other sheet representations. The plurality of data sources may then be printed on the sequence of sheets according to assignments of the data sources to the sheet representations.

21 Claims, 11 Drawing Sheets

US 8,885,227 B2

SYSTEM AND METHOD FOR MULTIPLE PAGE-PER-SHEET PRINTING

BACKGROUND

In contemporary data processing technologies, a user may access, generate, and view data from various sources. Data may be viewed through the use of one or more applications, such as multi-media applications, presentation applications, or various other application programs run by a data processing system. Additionally, the data processing system may be connected with a network, such as the Internet, and thereby access any number of data sources deployed within the network. A browser application is typically used for viewing a data source accessed by way of the Internet.

A user may often desire to print a hardcopy of various data sources viewed or otherwise accessed through the use of a data processing system. A browser may be used to print hardcopies of web pages on a page-by-page basis as the web pages are viewed by the user. However, such a method of hardcopy production does not facilitate organization of the data that is being printed.

Various presentation applications allow a user to organize pages, such as slides containing text and/or images, prior to printing a hardcopy of the pages. For example, a common presentation application allows a user to view slides of data, rearrange the sequence in which the slides are to be displayed, and print the slides in the arranged sequence. Moreover, multiple slides may be arranged to be printed on a single sheet or print page. However, conventional presentation applications allow a single selection of the number of slides per page. Each printed sheet of a slide presentation then features the same number of slides per sheet. Moreover, presentation applications do not provide for print organization of data obtained from different network resources.

BRIEF DESCRIPTION OF THE DRAWINGS

Aspects of the present disclosure are best understood from the following detailed description when read with the accompanying figures.

DETAILED DESCRIPTION

Figure 1:
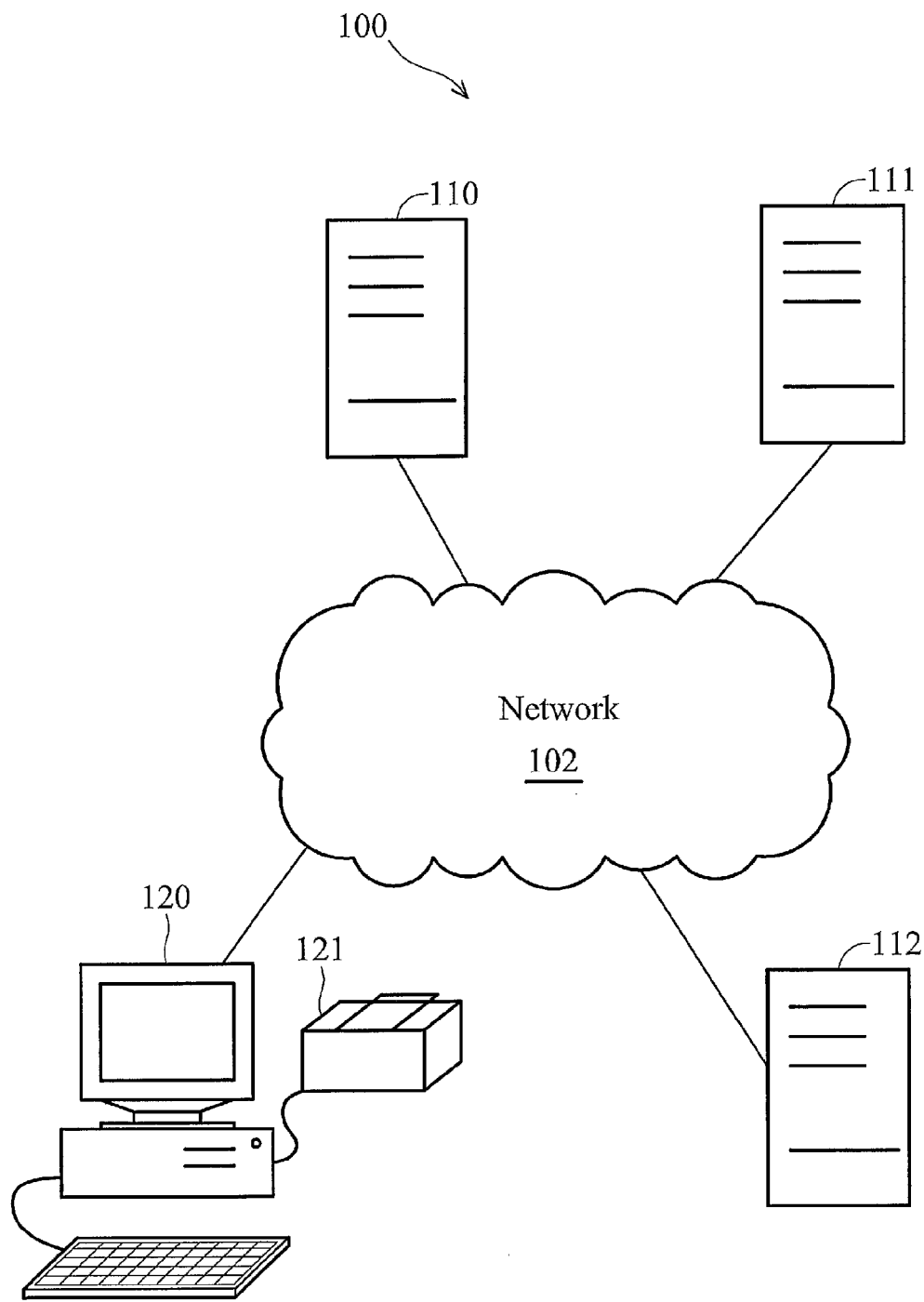
FIG. 1 is a simplified diagram of a network system in which multiple page-per-sheet printing embodiments may be implemented.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

With reference now to the figures, FIG. 1 is a simplified diagram of a network system 100 in which embodiments may be implemented. Network system 100 includes a network 102 that provides a medium for communications between various devices and computers communicatively coupled by network system 100. Network 102 may be implemented as one or more of various networks, such as the Internet, an intranet, a local area network, a wide area network (WAN), or another network architecture that facilitates communications between network connected devices. Network 102 may include any one or more of various communication connections, such as wire, wireless, fiber optic, satellite links, or other communication media.

In the present example, various servers 110-112 are connected to network 102. In addition, a client 120 is connected to network 102. Servers 110-112 may be implemented as hypertext transfer protocol (HTTP) servers, file transfer protocol (FTP) servers, application servers, or other devices that provide data sources such as web pages or other content to client 120 connected therewith. Client 120 may be implemented as a personal computer, a portable computer, a network computer, or another computational device. Client 120 may be interconnected with a local printer 121 and/or a network printer for producing hardcopy output of data sources in accordance with multiple page-per-sheet printing mechanisms described herein.

Figure 2:
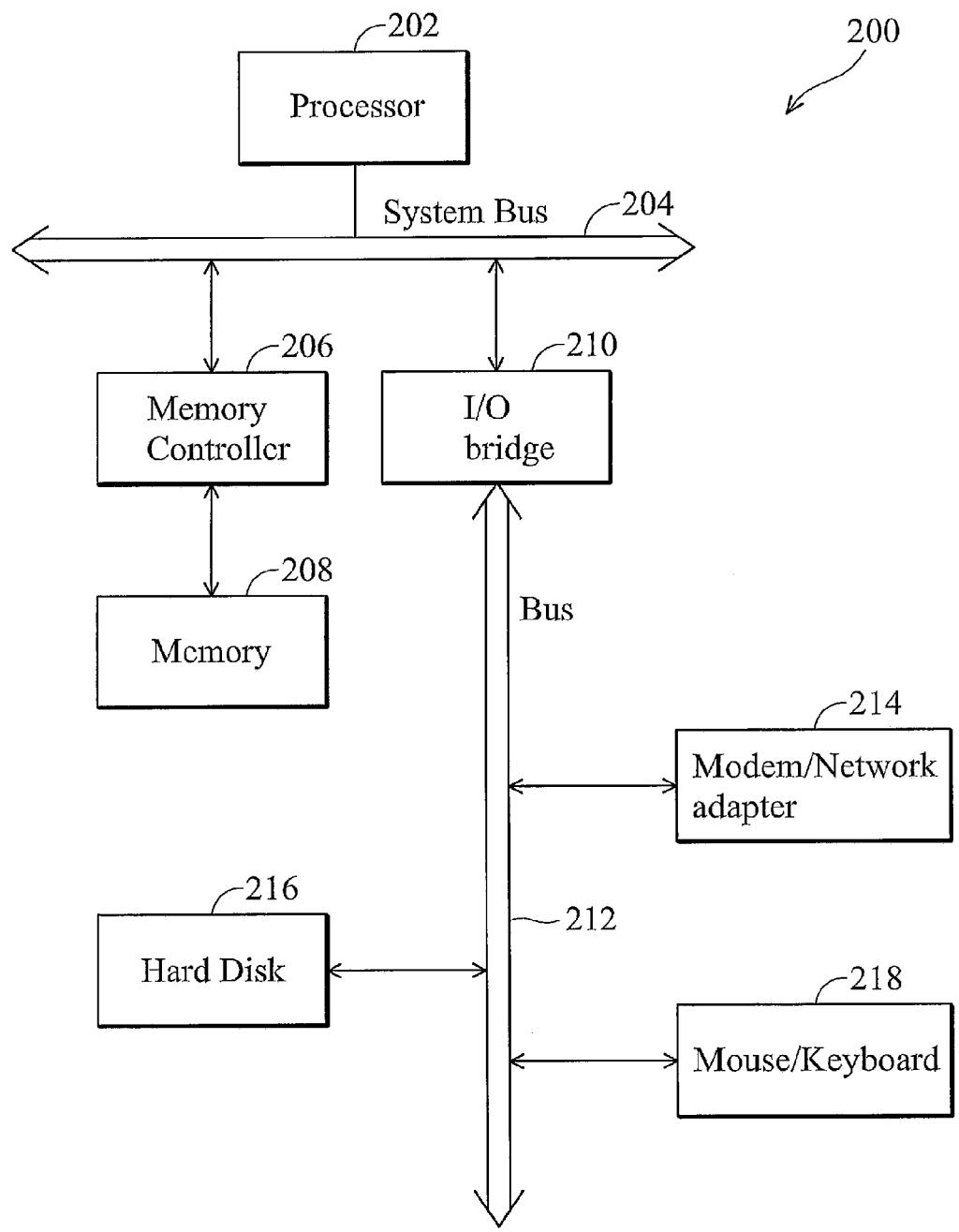
FIG. 2 is a simplified block diagram of a client computer system that may be configured to implement embodiments of multiple page-per-sheet printing.

FIG. 2 is a simplified block diagram of a client computer system 200, such as client 120 shown in FIG. 1, that may be configured to implement embodiments of multiple page-per-sheet printing. Computer system 200 includes a processor 202 interconnected with a system bus 204. System bus 204 provides couplings to subsystems and components of computer system 200. A memory controller 206 interconnected with a system memory 208 provides a communicative coupling between memory 208 and processor 202. Memory 208 may store executable instructions that provide multiple page-per-sheet functionality as described more fully below. An input/output bridge 210 may be connected with system bus 204, and one or more input/output devices may be connected with an I/O bus 212. For example, a hard disk 216 may provide non-volatile storage, and a modem or network adapter 214 may provide a communication interface that facilitates communication exchanges between computer system 200 and one or more data resources, such as servers 110-112 shown in FIG. 1. Additionally, user input devices, such as a mouse/keyboard 218, may be coupled with I/O bus 212 and facilitate user input to computer system 200. The configuration of computer system 200 is illustrative and is chosen only to facilitate an understanding of embodiments described herein.

In accordance with embodiments described herein, mechanisms that facilitate printing multiple pages per sheet are provided. A document including a plurality of pages may have different pages thereof individually formatted. For example, some pages of a document may be formatted and printed in a landscape style, and other pages of the same document may be formatted for printing in a portrait style. Moreover, pages of the document may be accumulated from different data sources. For example, the document may be accumulated or otherwise generated from different web pages that are selected and temporarily saved. A user may identify various web pages while browsing the Internet and invoke a command to temporarily collect or otherwise save the web pages. Web pages that are saved may be organized and printed in accordance with multi-page per sheet production as described more fully below. As referred to herein, a document comprising content of multiple data sources that is to be printed or saved according to multiple page-per-sheet mechanisms does not necessarily comprise a discreet file. Rather a document comprising multiple data source content may be defined by logical associations or groupings of data source objects, files, pages, or other data source entities.

Figure 3:
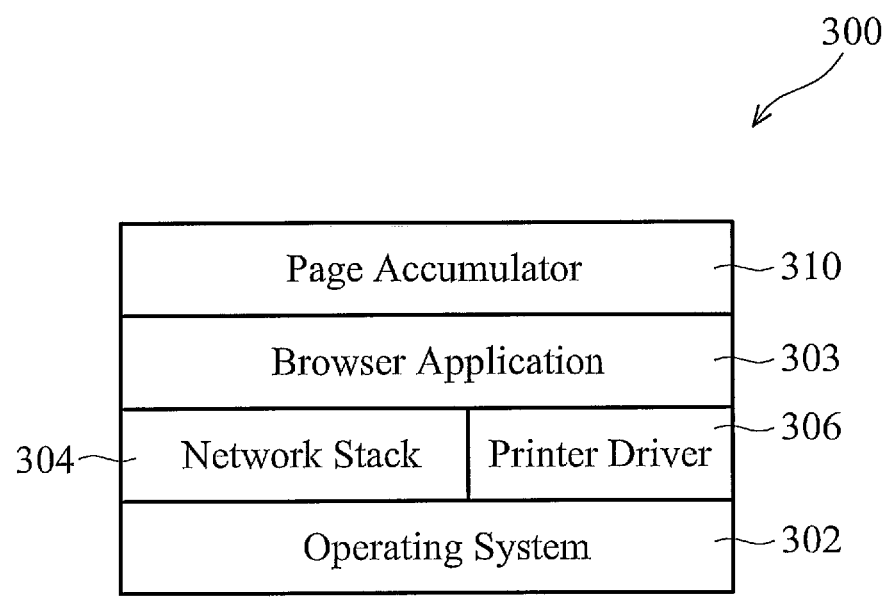
FIG. 3 is a simplified diagram of an embodiment of a software configuration that facilitates multiple page-per-sheet printing.

FIG. 3 is a simplified diagram of an embodiment of a software configuration 300 that facilitates multiple page-per-sheet printing. Software configuration 300 comprises sets of computer-executable instructions or code that may be fetched from a memory and executed by a processing unit of a data processing system, such as data processing system 200 shown in FIG. 2.

Software configuration 300 may include an operating system 302, such as a Windows operating system manufactured by Microsoft Corporation of Redmond, Wash., an OS/2 operating system manufactured by International Business Machines Corporation of Armonk, N.Y., or the like. Operating system 302 may optionally include a network stack 304 for effecting network communications. For example, network stack 304 may be implemented as a transmission control protocol/Internet protocol (TCP/IP) stack. However, embodiments described herein may be implemented with or without network functionality. A printer driver 306 may include instructions for interacting with a printer device, such as printer 121 shown in FIG. 1. Printer driver 306 may, for example, be implemented as a dynamic link library file that is loaded and run upon invocation of a print command by an application. A browser application 308 comprises an application program adapted to visually output data sources and that may invoke printer driver 306 for production of printed images. Browser application 308 may be implemented as a media presentation application, a web browser, a word processing application, or other application capable of providing visual output of data sources. In the event browser application 308 is implemented as a web browser, operating system 302 preferably includes optional network stack 304.

A page accumulator 310 comprises instructions for accumulating selected data sources for storage or printing. Page accumulator 310 may also include instructions that facilitate organization of selected data sources. Page accumulator 310 may be implemented as an application program or an application plug-in. For example, in one embodiment, page accumulator 310 may be implemented as a plug-in to browser application 308 that extends the functionality of browser application 308 to include multiple page-per-sheet printing and organizational capabilities.

Figure 4:
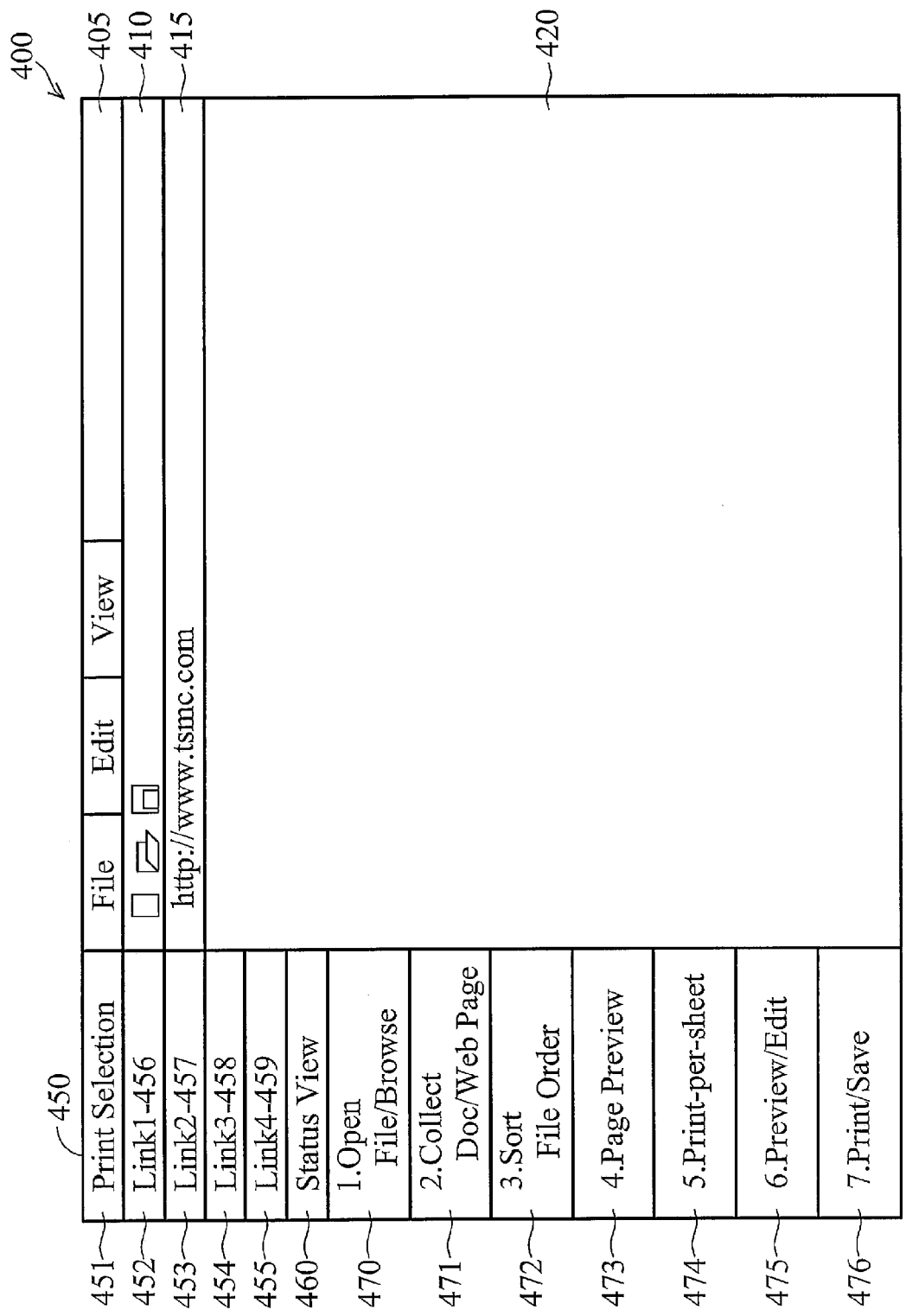
FIG. 4 is a diagram of an embodiment of a graphical user interface of a browser application configured in accordance with an open control that facilitates viewing and collection of data sources for multiple page-per-sheet printing.

FIG. 4 is a diagram of an embodiment of a graphical user interface (GUI) 400 of browser application 308 configured in accordance with an open control 470 that facilitates viewing and collection of data sources for multiple page-per-sheet printing. GUI 400 may include a menu bar 405 of pull down menus, a toolbar 410 having various icons that invoke respective actions or functions when selected, and a uniform resource locator (URL) field 415 for input or display of a URL that specifies a data source location or address. A window 420 provides a display area for visual output of a web page, document, or other data source. For example, window 420 may provide visual output of a web page or document specified in URL field 415.

An accumulator panel 450 provides user control of page accumulator functionality. Accumulator panel 450 may include a print selection sub-panel 451 that includes a list of data sources that have been collected for printing. In the illustrative example, four links 456-459 (Link1-Link4) have been selected and are displayed in print selection sub-panel 451. Each link 456-459 may respectively have an associated control 452-455 for selecting and deselecting the corresponding link. As referred to herein, a link comprises a data source identifier, such as a web page title, web page URL, document title, document location, or the like. Controls 452-455 may comprise graphical selection boxes that display a check mark or other designation that indicates the corresponding link is selected for printing or storage.

Accumulator panel 450 may include a user-selectable status view control 460 that invokes one or more methods, subroutines, or other logic of page accumulator 310 for changing a display mode of GUI 400. For example, status view control 460 may comprise a toggle control that alternatively switches GUI 400 between an application mode and a template mode. In the present example, GUI 400 is shown in an application mode for displaying data sources in window 420.

Additionally, accumulator panel 450 may include various user-selectable procedure controls that each invoke one or more methods, subroutines, or other logic of page accumulator 310. For example, an open control 470 may invoke accumulator logic to display a data source in window 420. A data source opened or otherwise accessed by way of open control 470 may comprise a document or other file in a local or network storage device, a network resource such as a web page, or another data source that may be accessed by the computer system running page accumulator 310.

A collect control 471 may be used to invoke accumulator logic for collecting or accumulating a data source for printing or storage in accordance with multiple page-per-sheet printing procedures described herein. For example, a user may display a data source in window 420 by entering the data source URL in URL field 415. The data source is then collected for later printing or storage by the selection of collect control 471. Responsive to the selection of a data source by the activation of collect control 471, an identification of the collected data source is provided in print selection sub-panel 451. For example, a link, such as link 459, is produced in sub-panel 451 for the data source having a URL entered in URL field 415 upon selection of collect control 471. A check mark or another visual designation may be displayed in control 455 associated with link 459 to indicate that the data source represented thereby is currently selected for later printing or storage. The user may then toggle the selection of the data source represented by link 459 by alternatively selecting and de-selecting control 455.

A sort control 472 may be used to invoke accumulator logic for sorting collected data sources for printing or storage. Additionally, selection of sort control 472 may toggle GUI 400 to a mode that facilitates sorting of collected data sources. A page preview control 473 may be used to invoke the accumulator logic for displaying a preview of images representative of collected data sources in an order in which the data sources are arranged. A print-per-sheet control 474 may be used to invoke the accumulator logic for assigning data sources to a particular sheet of a sheet sequence to be printed or saved. A preview/edit control 475 may be used to invoke the accumulator logic for displaying a preview of sheets with images of data sources assigned thereto for allowing edits to be made to the configuration of data sources to be printed. A print/save control 476 may be used to invoke the accumulator logic for printing or saving a configuration of sheets having one or more data sources assigned thereto. Other controls may be included with, or substituted in lieu of, one or more controls 470-476.

Figure 5:
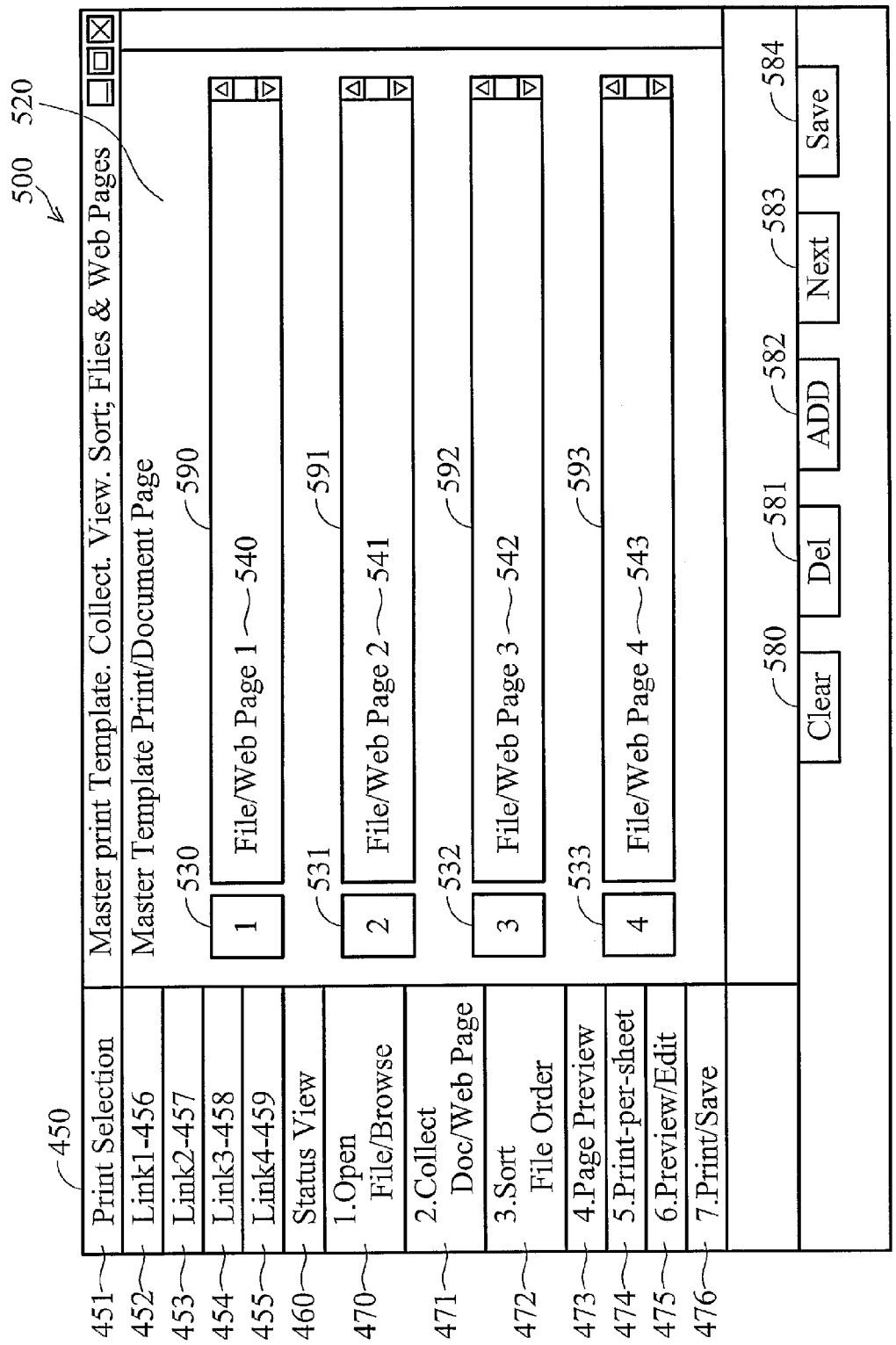
FIG. 5 is a diagram of an embodiment of a graphical user interface of a browser application configured in accordance with a sort control that facilitates organization of collected data sources for multiple page-per-sheet printing.

FIG. 5 is a diagram of an embodiment of a GUI 500 of browser application 308 configured in accordance with sort control 472 that facilitates organization of collected data sources for multiple page-per-sheet printing. GUI 500 may include a window 520 for display of collected links for sorting thereof. GUI 500 may also include accumulator panel 450.

The sort configuration of GUI 500 provides a visual output of the order in which collected data sources are to be printed and mechanisms for a user to reconfigure the print order. For example, window 520 may include various fields 590-593 that display data source identifiers 540-543 (File/Web Page 1—File/Web Page 4) of collected data sources in a configuration in which the data sources are currently configured. Each data source identifier 540-543 corresponds to a link 452-455 displayed in print selection sub-panel 451 that has a corresponding control 452-455 indicating the respective link is actively selected for multiple page-per-sheet printing. For example, data source identifier 540 may correspond to collected link 456 displayed in print selection sub-panel 451. A print order of collected data sources is identified by corresponding order controls 530-533 each respectively associated with one of the data source identifiers. In the present example, data sources having data source identifiers 540-543 are configured for sequential printing (as illustratively designated by order controls 530-533 having display values of 1-4). Order controls 530-533 may be selected, for example by clicking a mouse, to modify the order thereof. An order control provides a visual indication to the user of the order in which the data source specified by the corresponding data source identifier is currently configured for printing and provides a mechanism for a user to re-order the collected data source print order. Additionally, GUI 500 may include various controls for modifying the data source collection. In the illustrative example, GUI 500 includes a clear control 580 a delete control 581, an add control 582, a next control 583, and a save control 584. Clear control 580 may remove all displayed data source identifiers upon selection thereof. Delete control 581 may remove a selected data source identifier upon activation of the delete control. Add control 582 may insert an additional field into window 520 in which a user may enter or select another identifier of a data source. Next control 583 may invoke window 520 to progress to another view of additional data source identifiers. Save control 584 may save the data sources having data source identifiers 540-543 in the current order thereof into a document. Other controls may be included in GUI 500 in addition to, or in lieu of, one or more controls 580-584.

Figure 6:
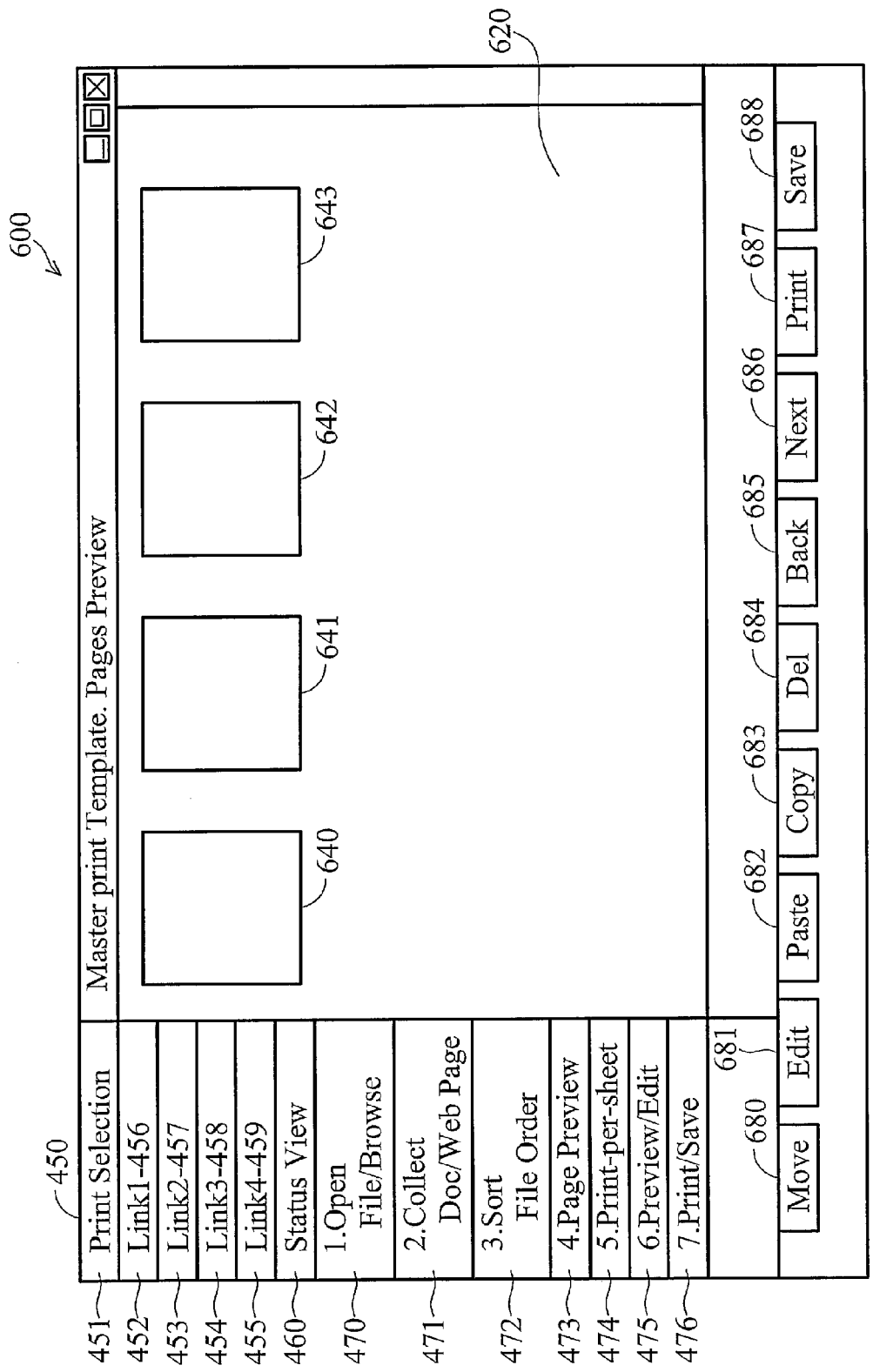
FIG. 6 is a diagram of an embodiment of a graphical user interface of a browser application configured in accordance with a page preview control that facilitates multiple page-per-sheet printing.

FIG. 6 is a diagram of an embodiment of a GUI 600 of browser application 308 configured in accordance with page preview control 473 that facilitates multiple page-per-sheet printing. GUI 600 may include window 620 for visual display of thumbnail representations of collected data sources for sorting thereof. GUI 600 may also include accumulator panel 450.

The print preview configuration of GUI 600 provides a visual output of collected data sources in a current sequential configuration thereof. In the illustrative example, GUI 600 includes thumbnail images 640-643 representative of collected data sources in an order in which the data sources are configured for multiple page-per-sheet printing. Each thumbnail image corresponds to one of links 456-459 of collected data sources. The page preview provided by GUI 600 thus provides a visual output of collected data sources and the order in which collected data sources are configured for multiple page-per-sheet printing. The order of collected data sources may be modified by, for example, selecting a thumbnail image and performing a drag-and-drop procedure.

Additionally, GUI 600 may include various controls for modifying the configuration of collected data sources for printing or saving. For example, GUI 600 may include a move control 680 for modifying the sequential order of collected data sources having a respective corresponding page image displayed in window 620. An edit control 681 may be selected for editing thumbnail content displayed in window 620. A paste control 682 may be selected for pasting a thumbnail of a data source into the sequence of thumbnail images 640-643 displayed in window 620. In this instance, a link corresponding to the pasted thumbnail is additionally appended to the list of links 456-459 in print selection sub-panel 451. A copy control 683 may be selected to copy one or more selected thumbnail images 640-643 into a buffer or "clipboard" for later insertion into another document, thumbnail sequence, or other application. A delete control 684 may be selected to delete a selected thumbnail from the sequence of thumbnails images 640-643. If a thumbnail is deleted by selection of delete control 684, the link in the list of links 456-459 that corresponds to the deleted thumbnail image may also be deleted from print selection sub-panel 451. A back control 685 and a next control 686 may be selected to respectively proceed to a previous sequence of thumbnail image or a subsequent sequence of thumbnail images. A print control 687 may be selected to print the data sources having thumbnail images 640-643 displayed in window 620. The data sources corresponding to thumbnail images 640-643 may be saved to a file by selecting a save control 688.

Figure 7A:
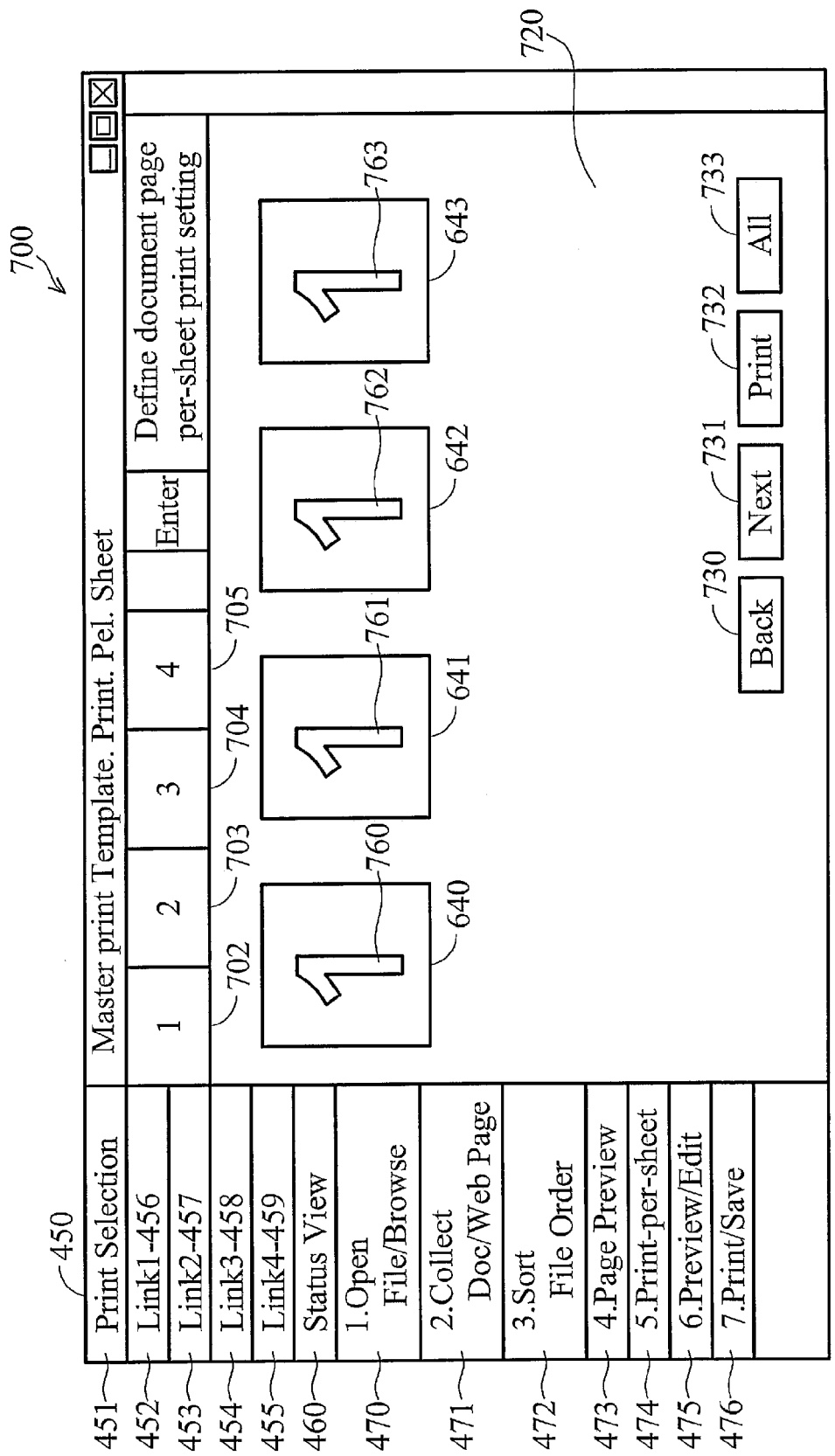
FIG. 7A is a diagram of an embodiment of a graphical user interface of a browser application configured in accordance with a print-per-sheet control that facilitates assignment of respective data sources to particular sheets in a sheet sequence.

FIG. 7A is a diagram of an embodiment of a GUI 700 of browser application 308 configured in accordance with print-per-sheet control 474 that facilitates the assignment of respective data sources to particular sheets in a sheet sequence to be printed according to multiple page-per-sheet printing procedures. GUI 700 includes thumbnail images 640-643 of data sources collected for multiple page-per sheet printing. Additionally, GUI 700 includes sheet controls 702-705 that provide user-selectable sheet assignments for data sources to be printed or saved. Each sheet control 702-705 includes a label that identifies a sheet number of a sequential sheet order. A sheet number may be associated with a data source and corresponds to the sheet number of a sequence of sheets in which the associated data source is to be printed. For example, a user may select a thumbnail image, such as thumbnail image 640, of a data source and subsequently select one of sheet controls 702-705. The numerical label of the selected sheet control is then associated with the data source of the selected thumbnail image and thus defines the sequential order in which the corresponding data source is configured for printing. In the illustrative example, each of thumbnail images 640-643 has been associated with a first page (as indicated by respective sheet selection indicators 760-763 superimposed over thumbnail images 640-643). Thus, data sources represented by thumbnail images 640-643 are currently configured for printing on a single sheet (sheet 1).

Additionally, GUI 700 may include a back control 730 and a next control 731 that may be selected to respectively proceed to a previous sequence of thumbnail images or a subsequent sequence of thumbnail images. A print control 732 may be selected to print the data sources having thumbnail images 640-643 displayed in window 720. In the event that a user desires to configure each data source having a thumbnail image displayed in GUI 700 for printing on separate sheets, an all control 730 may be selected for assigning all data sources to be printed on respective single sheets.

Figure 7B:
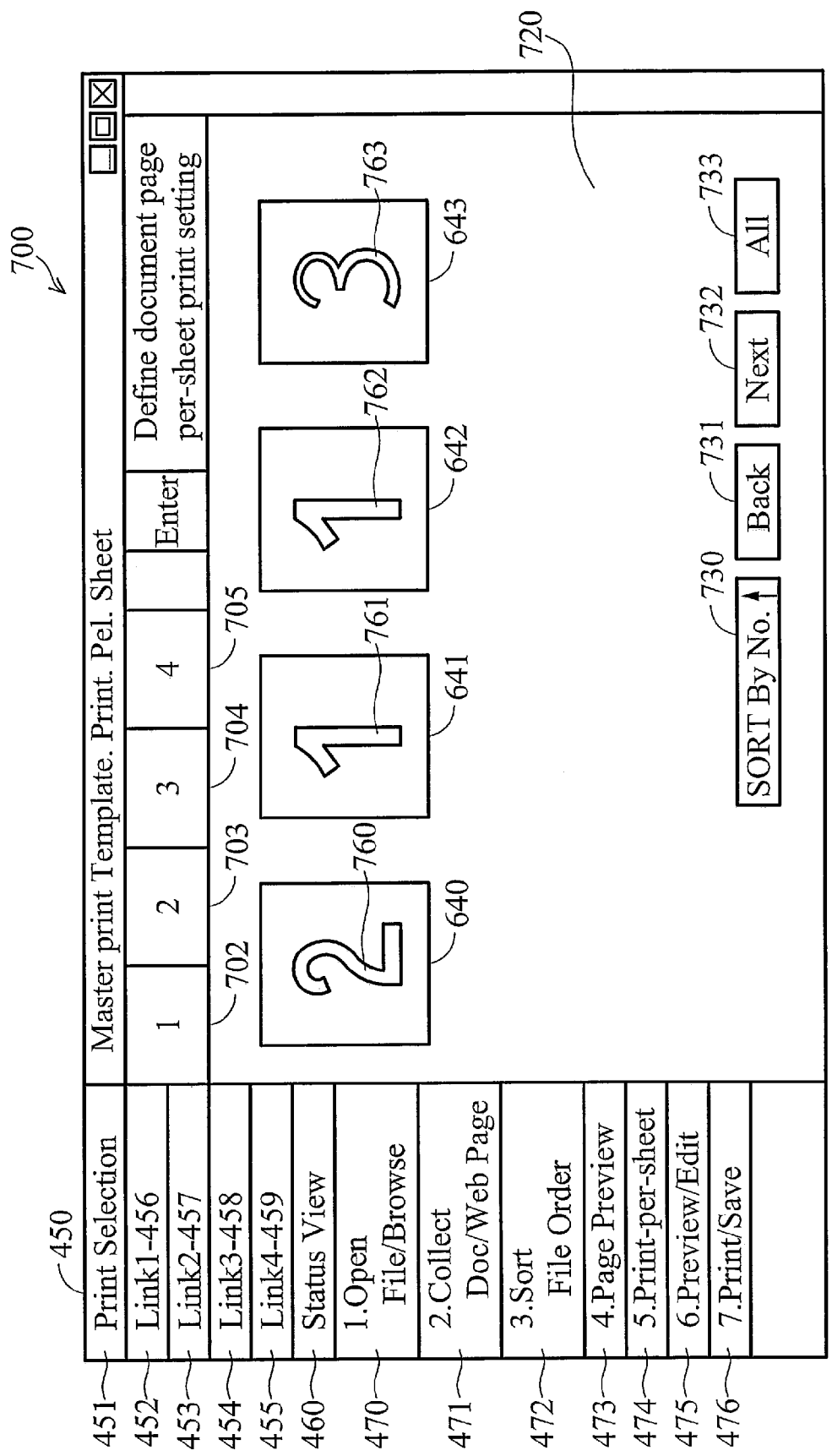
FIG. 7B is a diagram of an embodiment of a graphical user interface of a browser application configured in accordance with a print-per-sheet control after reassignment of one or more data sources to sheets of a sheet sequence.

FIG. 7B is a diagram of an embodiment of GUI 700 of browser application 308 configured in accordance with print-per-sheet control 474 after reassignment of one or more data sources to sheets of a sheet sequence. In this example, data sources represented by thumbnail images 640-643 are configured for printing on multiple sheets. Particularly, a data source represented by thumbnail image 640 is configured for printing on a second sheet of a sheet sequence as illustratively designated by sheet selection indicator 760 (having a graphical designation of "2"). The data sources represented by respective thumbnail images 641-642 are configured for printing on a first sheet of the sheet sequence as illustratively designated by sheet selection indicators 761 and 762 (each having a graphical designation of "1"). The data source represented by thumbnail image 643 is configured for printing on a third sheet of the sheet sequence as illustratively designated by sheet selection indicator 763 (having a graphical designation of "3). Thus, data sources represented by thumbnail images 640-643 are shown configured for printing on a sequence of three sheets with the data sources represented by thumbnail images 640 and 643 configured for printing on a respective single sheet and the data sources represented by thumbnail images 641 and 642 configured for printing on a common sheet.

Figure 7C:
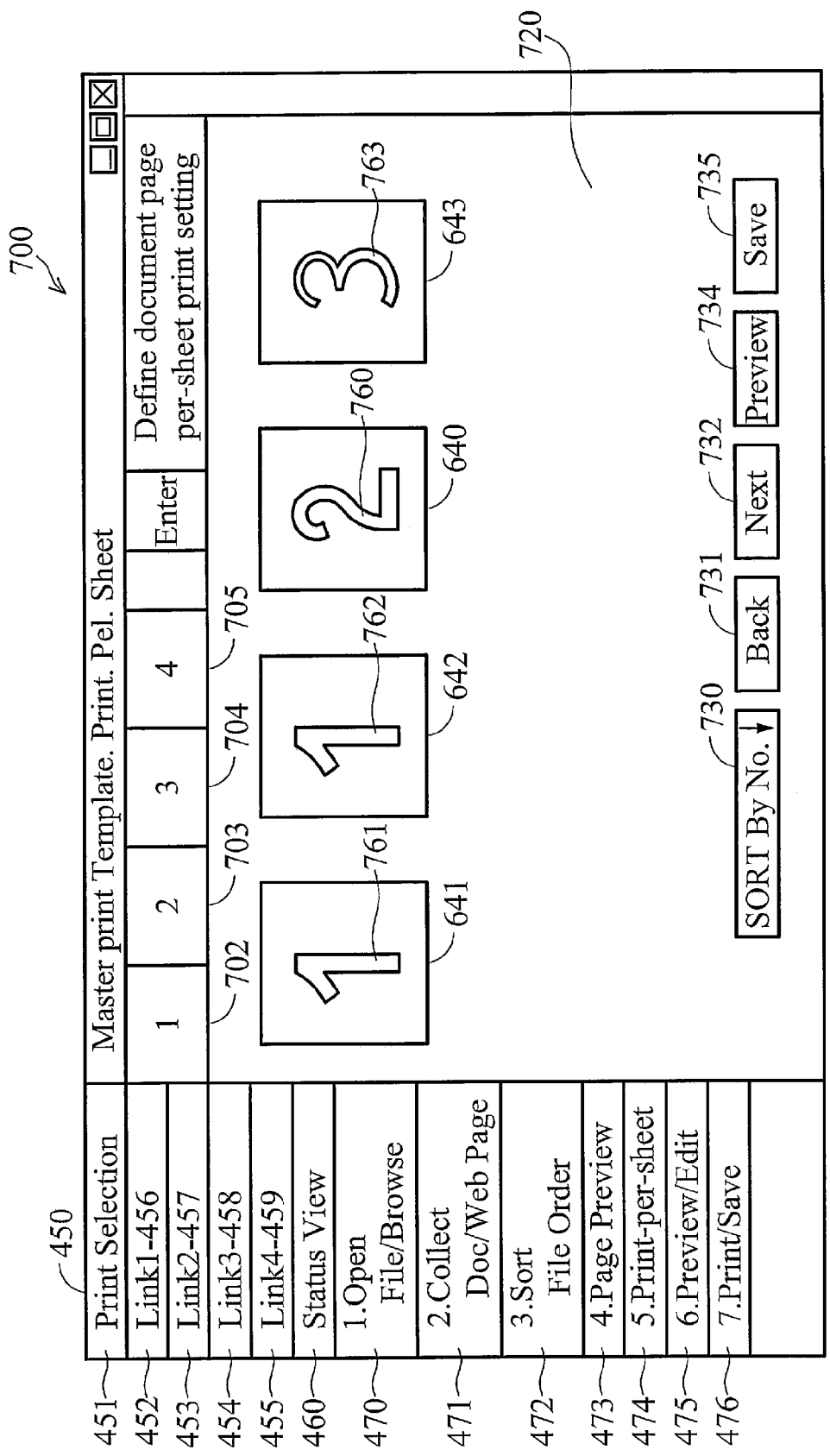
FIG. 7C is a diagram of an embodiment of graphical user interface as displayed in response to selection of a sort by number control.

GUI 700 configured in the print-per-sheet mode may additionally include other controls that facilitate ordering of data sources for printing. For example, GUI 700 may include a sort-by-number control 730 that invokes a method of accumulator 310 for displaying thumbnail images of data sources collected for printing in the sheet order in which the data sources are currently configured for printing. For example, thumbnail images 640-643 may be displayed in the sheet order in which the corresponding data sources are configured for printing in response to selection of sort by number control 730. In the event that sort by number control 730 is selected, GUI 700 may be refreshed or otherwise regenerated such that the thumbnail images are displayed in sequential order of the sheets to which the associated data sources are assigned. For example, FIG. 7C is an embodiment of GUI 700 as displayed in response to selection of sort by number control 730. Sort by number control 730 invokes one or more methods or other logic of accumulator 310 that provides display of thumbnail images in order of ascending or descending sheet numbers in a sheet sequence. For example, when sort by number control 730 is selected in the GUI configuration shown in FIG. 7B, thumbnail images 640-643 are re-ordered in ascending order of the associated sheet number as showing in FIG. 7C. In this instance, thumbnail images 641 and 642 are displayed first in the sequence of displayed thumbnail images and are sequentially followed by thumbnail image 640 and thumbnail image 643. Additionally, sort by number control 730 may toggle between ordering thumbnail images in ascending or descending order.

Figure 8:
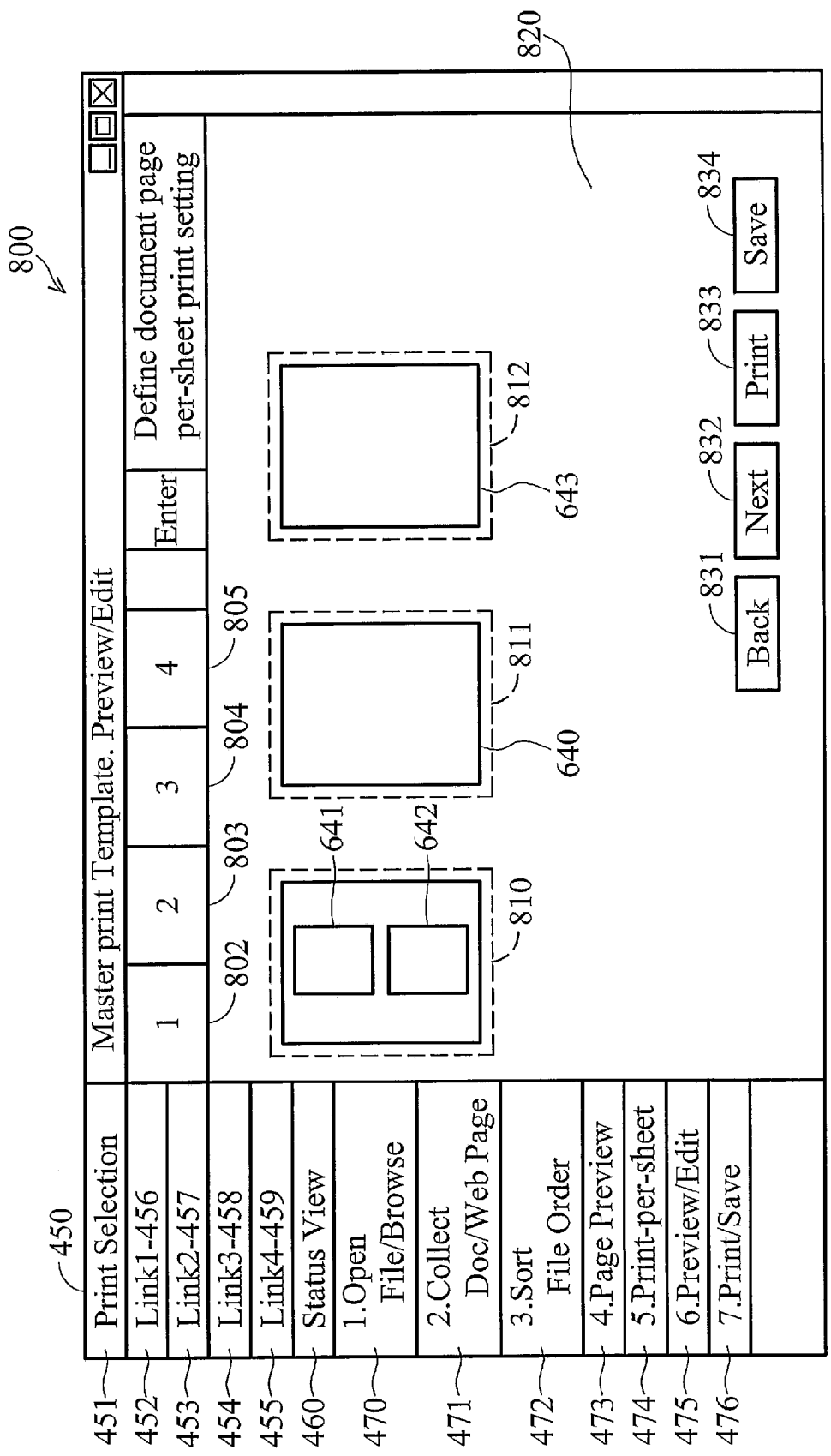
FIG. 8 is a diagram of an embodiment of a graphical user interface of a browser application configured in accordance with a print/save control that facilitates multiple page-per-sheet printing.

FIG. 8 is a diagram of an embodiment of a GUI 800 of browser application 308 configured in accordance with print/save control 476 that facilitates multiple page-per-sheet printing. In this example, thumbnail images 640-643 are displayed in a window 820 in a page-per-sheet configuration that provides a visual indication of the data sources as configured for printing. GUI 800 may include sheet representations 810-812 (illustratively designated with dashed lines) that encompass one or more thumbnail images of data sources as configured for multiple page-per-sheet printing. For example, data sources represented by thumbnail images 641 and 642 previously configured by the sort by number control described in FIGS. 7A-7C are displayed on a first sheet representation 810 of a sheet sequence comprising sheet representations 810-812. Likewise, data sources represented by thumbnail images 640 and 643 have been configured by the sort by number control for printing on respective second and third sheets of a sheet sequence and thus have corresponding thumbnail images displayed within respective sheet representations 811 and 812.

GUI 800 also may provide organization functionality of the sheet sequence. A user may perform a drag-and-drop procedure to re-organize the sequence in which sheets are to be printed. For example, a user may select sheet representation 811 by performing a mouse click thereon and drag sheet representation 811 to the position in window 920 in which sheet representation 810 is located. GUI 800 would then interchange the displayed positions of sheet representation 810 and 811, and the sheet sequence is updated accordingly. A user may select a print control 833 for multiple page-per-sheet printing of the displayed sheet sequence at any time during display of GUI 800.

Figure 9:
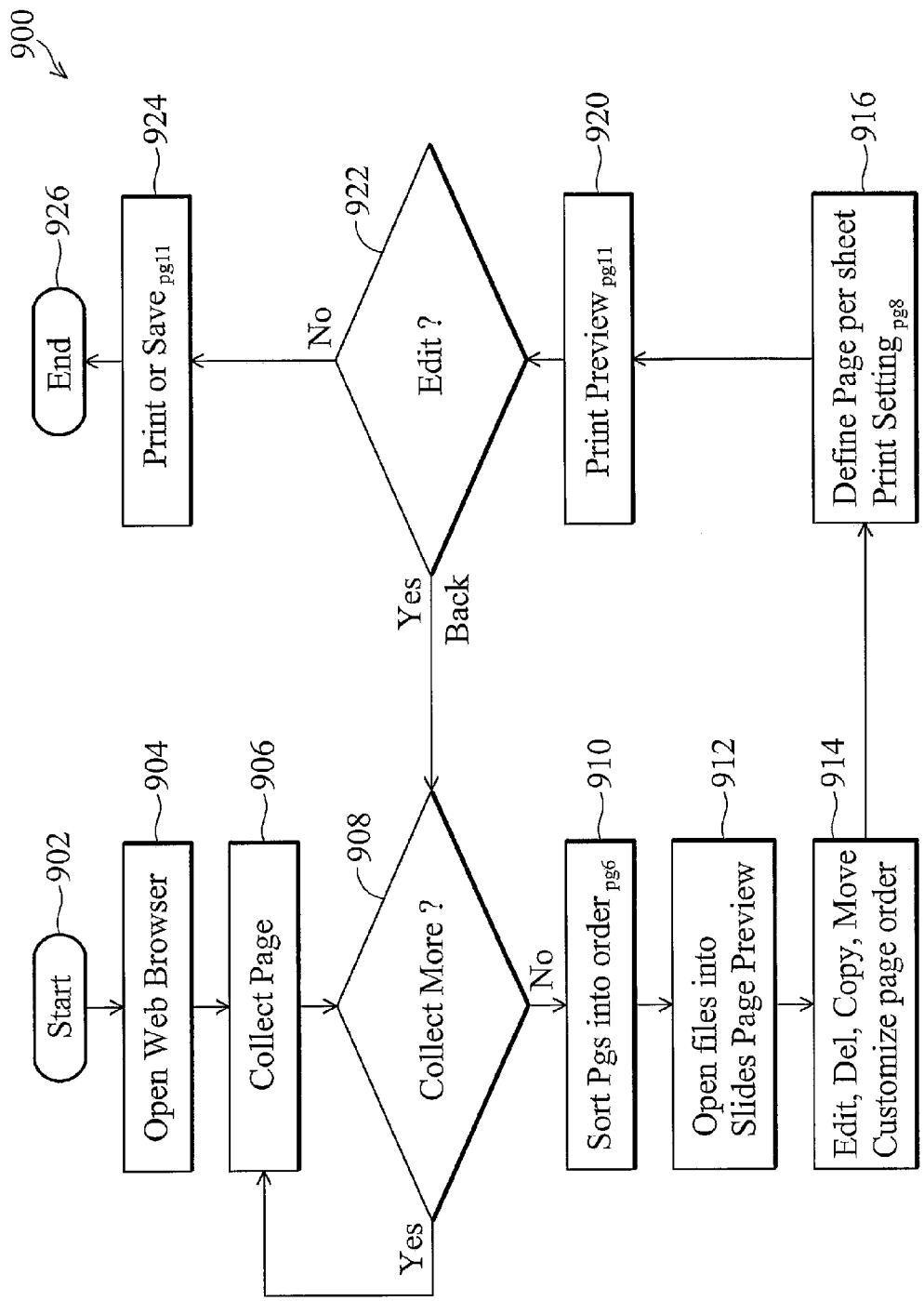
FIG. 9 is a flowchart of an embodiment of browser application processing for performing multiple page-per-sheet printing.

FIG. 9 is a flowchart of an embodiment of a browser application having page accumulator 310 functionality for performing multiple page-per-sheet printing. Browser application 308 is invoked (step 902), and the browser application is opened (step 904). The user may then browse to web pages or other data sources, for example files located on the computer system running browser application 308 or files located on a network connected therewith, and collect a web page or other data source for multiple page-per-sheet printing (step 906). If the user desires to collect additional web pages or other additional data sources (step 908), browser application 308 returns to the page collection process according to step 906.

After all desired web pages or other data sources have been collected, the user may proceed to sort the collected data sources or pages for multiple page-per-sheet printing (step 910). The user may select the sort procedure by selecting sort control 472. The browser application then provides GUI 500 displayed in the sort configuration as described with reference to FIG. 5.

After the collected data sources have been sorted, the sorted data sources may be displayed in a page preview mode (step 912). For example, the browser application may proceed to a page preview mode in response to user selection of page preview control 473. The browser application then provides GUI 600 for display of page images representative of collected data sources in a current configuration thereof as described with reference to FIG. 6.

The page order may be edited after the collected data sources are displayed in the page preview mode (step 914).

For example, pages may be edited, deleted, copied or moved according to the user's preference. Page-per-sheet configuration edits may then be made to view sheets in ascending or descending order (step 916) as described with reference to FIG. 7C. A print preview mode may be selected prior to printing a sequence of sheets by selecting preview/edit control 475 provided by a GUI of browser application 308 (step 920). Final edits to a sheet sequence may be made in the print preview mode by performing drag-and-drop manipulation of sheets or other operations as described with reference to FIG. 8. An evaluation may then be made to determine if the user desires to edit the page configuration (step 922). For example, the user may desire to collect more data sources for printing or perform other configuration edits. In the event the user desires to perform additional edits, the browser application may return to step 908 to evaluate if additional data sources are to be collected. The sheet sequence of data sources are printed or saved when no additional edits are desired by the user and a print or save command is invoked (step 924). For example, the user may select a print control 833 or a save control 834 in a GUI configured according to print/save control 476 as described with reference to FIG. 8. After printing or saving a sheet sequence, the browser application cycle may terminate (step 926).

As described, embodiments provide mechanisms for efficient multiple page-per-sheet printing of data sources. Multiple data sources may be collected and merged into a common sequence of print sheets. Each sheet of a sheet sequence may be independently configured with a number of data sources to be printed thereon. Additionally, collected data sources may have respective print styles configured independently of other collected data sources. Various configuration controls are provided by a user interface that allows efficient organization of collected data sources for printing the data sources or saving the collected data sources to a storage device.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A computer-implemented method of outputting multiple data sources, comprising:
receiving a first user command to collect a plurality of data sources for outputting;
collecting the plurality of data sources for outputting in accordance with the first user command;
receiving a second user command to specify a print order for a plurality of pages of the data sources;
displaying the plurality of data sources as a plurality of sheet representations that represent the plurality of pages, each of the sheet representations is overlayed with a number that represents a page order of the sheet representations that are selected to print according to the second user command, more than one of the sheet representations of the plurality of sheet representations are overlayed with the same number, thereby resulting in more than one of the data sources being selected to print on a given page;
receiving a third user command to save or print the plurality of pages; and
outputting the plurality of sheet representations according to the third user command.

2. The computer-implemented method of claim 1, further comprising:
displaying a web page in a browser window; and
adding the web page to the plurality of data sources for outputting in response to receiving a collect command.

3. The computer-implemented method of claim 1, further comprising:
formatting each of the data sources in a respective print style, wherein a style of a data source is formatted independently of other data source styles.

4. The computer-implemented method of claim 1, further comprising displaying a plurality of images each respectively representative of one of the plurality of data sources.

5. The computer-implemented method of claim 4, further comprising:
selecting an image representative of a data source;
selecting one of a plurality of numerical identifiers that specify a sequence number;
assigning the sequence number to the data source; and
repeating the steps of selecting an image representation and selecting one of the plurality of numerical identifiers for one or more of the plurality of data sources.

6. The computer-implemented method of claim 1, further comprising displaying the sheet representations including images of data sources assigned thereto.

7. The computer-implemented method of claim 6, further comprising assigning a print order to each of the data sources within a sheet representation.

8. A non-transitory computer-readable medium having computer-executable instructions for execution by a processing system, the computer-executable instructions for performing a method of configuring data sources for output, comprising:
instructions that when executed provide a window that displays a data source;
instructions that when executed provide a control that, in response to selection thereof while the data source is displayed in the window, collect the data source for output, wherein the data source is one of a plurality of data sources;
instructions to display the plurality of data sources as a plurality of sheet representations that represent a plurality of pages, each of the sheet representations is overlayed with a number that represents a page order of the sheet representations that are selected to print, more than one of the sheet representations of the plurality of sheet representations are overlayed with the same number, thereby resulting in more than one of the data sources being selected to print on a given page; and
instructions that when executed receive a user command to save or print the plurality of pages; and
instructions that when executed output the plurality of sheet representations according to the user command.

9. The computer-readable medium of claim 8, further comprising:
instructions that display a web page in a browser window; and
instructions that receive a collect command, wherein the web page is added to the data sources for output in response to receipt of the collect command.

10. The computer-readable medium of claim 8, further comprising instructions that format each of the data sources in a respective print style, wherein a style of a data source is formatted independently of other data source styles.

11. The computer-readable medium of claim 8, further comprising instructions that display a plurality of images each respectively representative of one of the plurality of data sources.

12. The computer-readable medium of claim 11, further comprising:
- instructions that select an image representative of a data source;
- instructions that select one of a plurality of numerical identifiers that specify a sequence position of one sheet of the sheet representations, wherein the data source is assigned to the one sheet; and
- instructions that repeat the steps of selecting an image representation and selecting one of the plurality of numerical identifiers for one or more of the plurality of data sources.

13. The computer-readable medium of claim 8, further comprising instructions that display the sheet representations including images of data sources assigned thereto in the window.

14. The computer-readable medium of claim 13, further comprising instructions that assign a print order to each of the data sources, wherein the data sources are assigned to the sheet representations according to the print order.

15. A data processing system for outputting multiple pages, comprising:
- a memory that contains a browser and an accumulator module as a set of instructions; and
- a processing unit, responsive to execution of the set of instructions, that collects a plurality of data sources, assigns each data source to at least one of a plurality of sheet representations that represent a plurality of pages according to a user command, each of the sheet representations is overlayed with a number that represents a page order of the sheet representations that are selected to print, more than one of the sheet representations of the plurality of sheet representations are overlayed with the same number, thereby resulting in more than one of the data sources being selected to print on a given page.

16. The data processing system of claim 15, wherein the browser comprises a web browser, and the accumulator module comprises a plug-in application to the web browser, and the accumulator module is configured to receive a collect command, and a web page shown in the web browser is added to the plurality of data sources in response to receipt of the collect command.

17. The data processing system of claim 15, wherein the browser further displays a plurality of images each respectively representative of one of the plurality of data sources.

18. The data processing system of claim 15, wherein the browser further comprises a control to select an image representative of a data source, and a control to select one of a plurality of numerical identifiers that specify a sequence position of one sheet of the sheet representations, wherein the data source is assigned to the one sheet.

19. The data processing system of claim 15, wherein the browser displays the sheet representations including images of data sources assigned thereto.

20. The data processing system of claim 19, wherein the processing unit assigns a print order to each of the data sources, wherein the data sources are assigned to the sheet representations according to the print order.

21. The method of claim 1, wherein the plurality of sheet representations are displayed as a plurality of thumbnail images, wherein the method further comprises:
- receiving a fourth user command to paste an additional sheet representation into the plurality of thumbnail images.

* * * * *